(No Model.) 3 Sheets—Sheet 1.
P. GREDT.
PROCESS OF RECOVERING IODIDS, CHLORIDS, OR OTHER SALTS FROM BLAST FURNACE GASES.
No. 529,070. Patented Nov. 13, 1894.
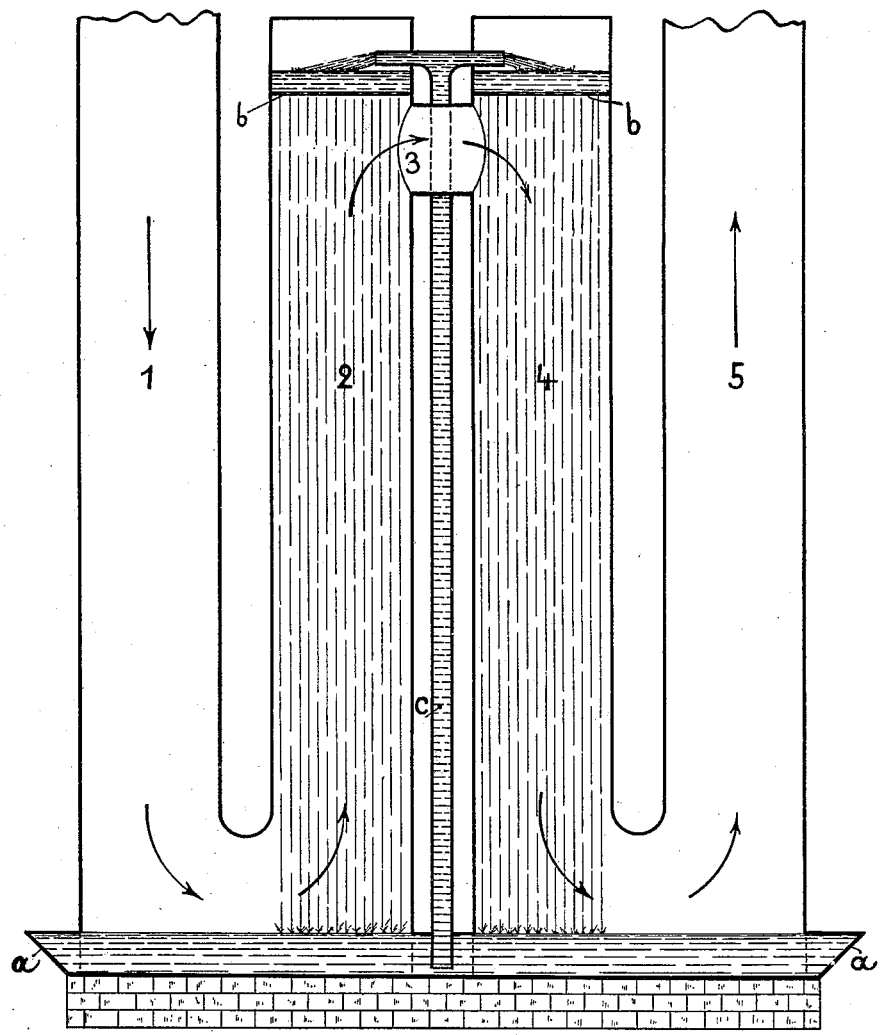
Fig. I.
Witnesses:
Walter Allen
H. H. Ronsaville
Inventor:
Paul Gredt
By Attorney:
Herbert W. T. Jenner (No Model.) 3 Sheets—Sheet 2.
P. GREDT.
PROCESS OF RECOVERING IODIDS, CHLORIDS, OR OTHER SALTS FROM BLAST FURNACE GASES.
No. 529,070. Patented Nov. 13, 1894.
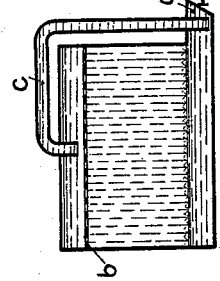
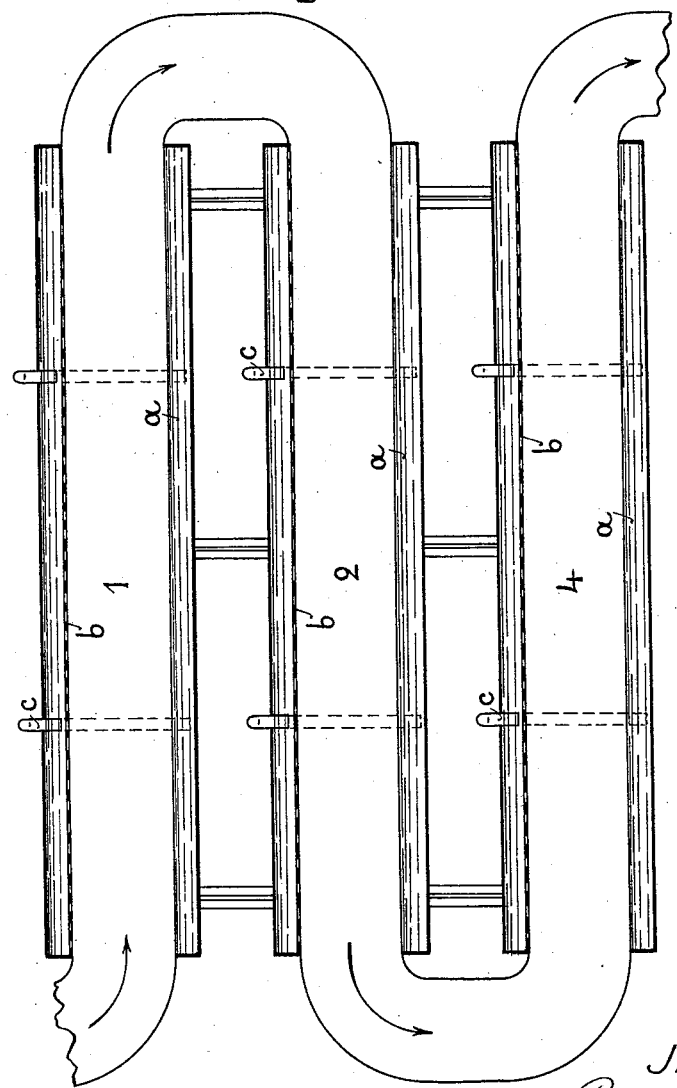
Witnesses: Walter Allen, W. N. Ronsaville
Inventor: Paul Gredt.
By Attorney: Herbert W. T. Jenner.

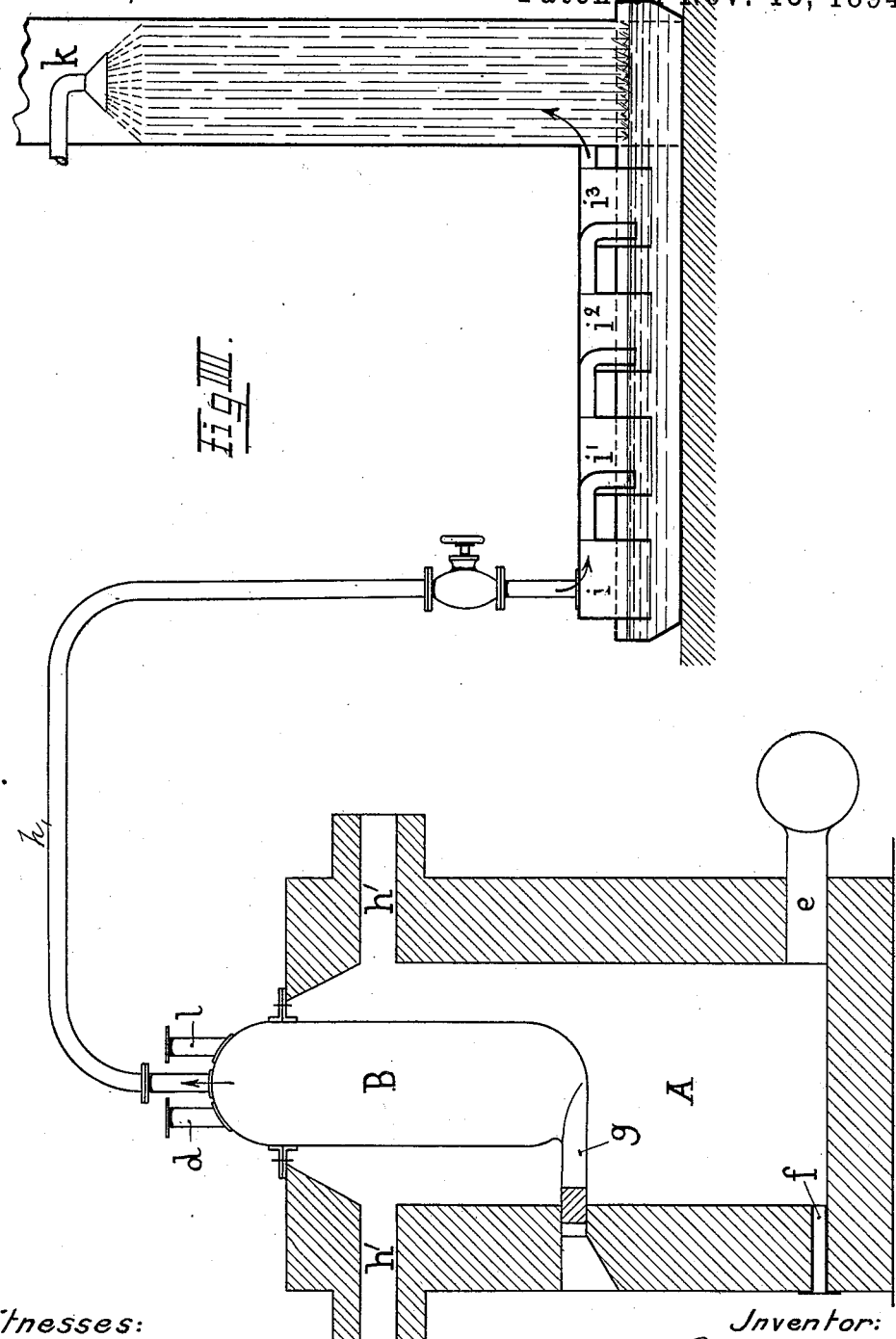

UNITED STATES PATENT OFFICE.

PAUL GREDT, OF ESCH, BELGIUM.

PROCESS OF RECOVERING IODIDS, CHLORIDS, OR OTHER SALTS FROM BLAST-FURNACE GASES.

SPECIFICATION forming part of Letters Patent No. 529,070, dated November 13, 1894.

Application filed June 29, 1894. Serial No. 516,094. (No specimens.) Patented in Luxemburg December 12, 1893, No. 1,941; in Belgium December 15, 1893, No. 107,577, and in France February 20, 1894, No. 234,431.

*To all whom it may concern:*

Be it known that I, PAUL GREDT, engineer, a citizen of the Grand Duchy of Luxemburg, residing at Esch-sur-Alzette, in the Grand Duchy of Luxemburg, Belgium, have invented certain new and useful Improvements in Processes of Recovering Iodids, Chlorids, and other Salts from Blast-Furnace Gases; and I do hereby declare the following to be a full, clear, and exact description of the invention, such as will enable others skilled in the art to which it appertains to make and use the same.

Patents for this invention have been obtained in the following countries: Belgium, No. 107,577, dated December 15, 1893; France, No. 234,431, dated February 20, 1894, and Luxemburg, No. 1,941, dated December 12, 1893.

This invention relates to the manufacture of iodid and chlorid of potassium and other salts; and it consists in the method of obtaining the same by treating blast furnace gases as hereinafter fully described and claimed.

In the drawings: Figure I is a sectional side view of one form of the apparatus used to extract the desired chemical substances and dust from the blast furnace gases. Fig. II is a similar view to Fig. I and shows a modification of the said apparatus. Fig. III is a cross-section through one of the pipes shown in Fig. II. Fig. IV is a sectional side view of the apparatus used for treating the concentrated lye obtained from the devices shown in Figs. I and II.

In carrying out this invention, the gases developed in a blast furnace are conducted through a series of pipes 1, 2, 3, 4, and 5, as indicated by the arrows in Fig. I, care being taken to proportion the pipes so that the velocity is not increased in passing through them. A pan $a$ is arranged under the pipes. The dust settles in this pan by gravity, and the steam which is mingled with the gases is condensed in the pipes and falls into the pan in the form of fine rain. This fine rain washes the gases in the pipes and extracts from them the cyanids and iodids of the alkalies which are mixed with them. The lye formed in the pan $a$, is pumped up the pipe $C'$ by any approved mechanism, not shown in the drawings, to the upper parts of the pipes, and is permitted to fall through the perforated plates $b$. The shower of lye assists in settling the dust and in extracting the cyanids and iodids of the alkalies. The lye is circulated until a sufficiently rich and concentrated lye has accumulated in the pan.

In the modification shown in Figs. II and III, the pipes 1, 2 and 4 are horizontal instead of vertical, but the action of the device is exactly the same as that shown in Fig. I, and the two forms of the device can be used in combination, if desired, the gases being first passed through one and then through the other. The purified gases after leaving the pipes are used for heating purposes in the ordinary approved manner.

The concentrated lye is removed from the pan $a$ periodically, and is placed in a retort B inclosed in a heating furnace A as shown in Fig. IV. The heating gas enters through the pipe $e$, and $f$ is the inlet for air to support combustion.

The pipes $d$ and $l$ are the inlets to the retort. $g$ is the outlet for the solid substances at the bottom of the retort, and $h$ is the outlet for the gases at the top of the retort.

Outlets $h'$ for the products of combustion are provided at the top of the furnace A.

The vapors and gases are conducted from the pipe $h$ through a series of chambers $i$, $i'$, $i^2$, and $i^3$, which contain dilute sulfuric acid, and are finally washed in the ordinary "Glover" tower $k$.

The concentrated lye from the pans $a$ is placed in the retort B. If desired, the lye may be still further concentrated by boiling it in shallow vessels before placing it in the retort.

When the retort is heated, its contents are evaporated and a partial decomposition of them takes place. Chlorid of ammonium and the volatile cyanids are driven off up the pipe $h$, and the chlorid of ammonium is converted into sulfate of ammonia and hydrochloric acid gas in the chambers $i$. The hydrochloric acid gas and the cyanids are liquefied in the "Glover" tower, and the gases which are not utilized pass up the chimney.

The solid matter remaining in the retort consists chiefly of iodid and chlorid of potassium, and chlorid of calcium. This solid matter is removed from the retort and is dissolved in water. The said chemicals are subsequently separated by fractional crystallization. The iodid of potassium may be converted into iodin by any approved method.

What I claim is—

In the process of recovering products from blast furnace gases, the improvements which consist in subjecting the said gases to the absorptive action of an aqueous liquid in the form of fine rain, and repeatedly circulating the said liquid until a strong lye is produced, subjecting said strong lye to heat until its volatile constituents are driven off, dissolving the solid residue which contains iodid and chlorid of potassium in water, and separating the iodid and chlorid by fractional crystallization, substantially as set forth.

In testimony whereof I affix my signature in presence of two witnesses.

PAUL GREDT.

Witnesses:
NOWEVEN PRINTZ,
JACQUES ZAHN.